Sept. 15, 1959 R. C. NORDRUM ET AL 2,904,122
CRASH PAD SPEAKER GRILLE
Filed Jan. 24, 1958 2 Sheets-Sheet 1

R. C. NORDRUM
D. WALASKAY
  INVENTORS
E. C. McRAE
BY J. R. FAULKNER
T. H. OSTER

ATTORNEYS

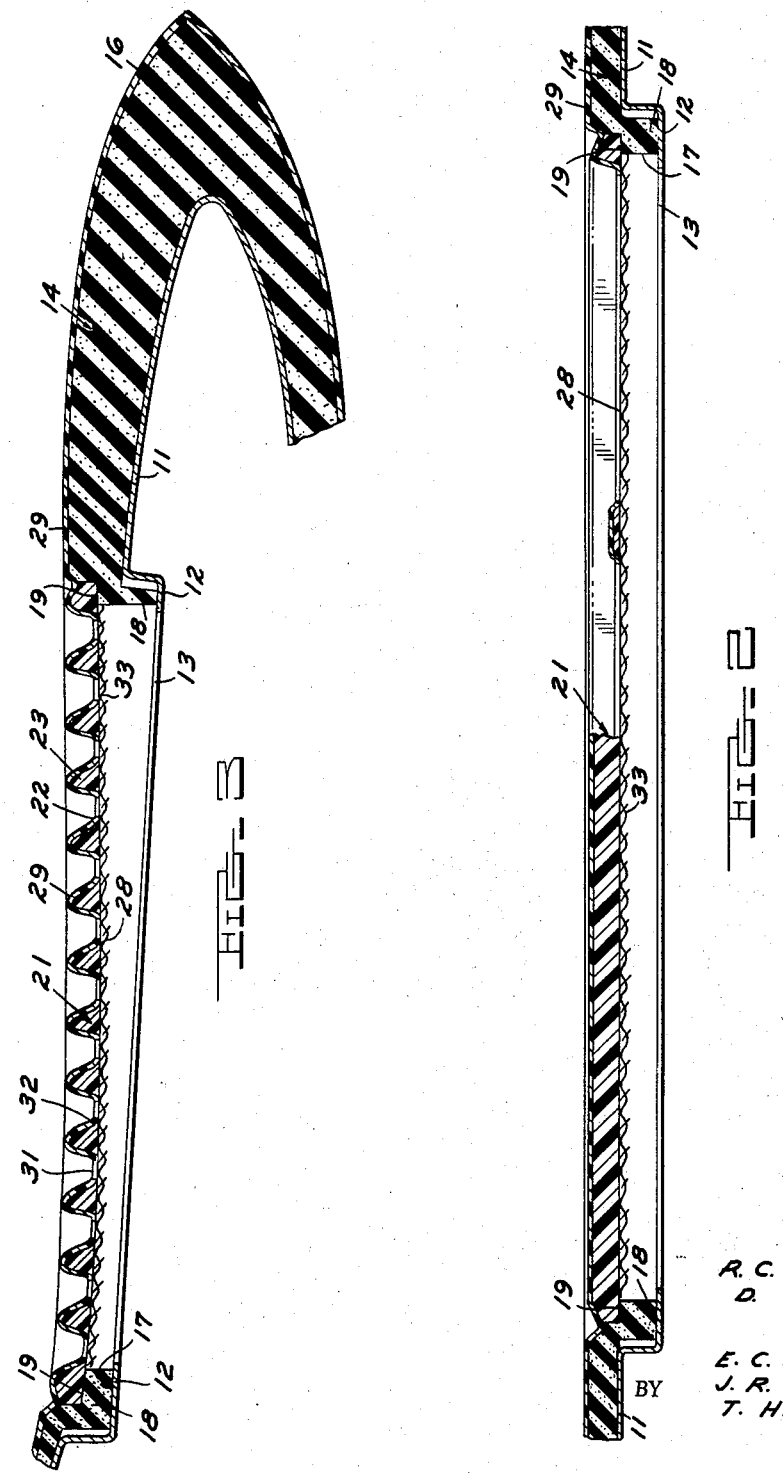

2,904,122
CRASH PAD SPEAKER GRILLE

Richard C. Nordrum, Bloomfield Hills, and Daniel Walaskay, Dearborn, Mich., assignors to Ford Motor Company, Dearborn, Mich., a corporation of Delaware Application January 24, 1958, Serial No. 710,992

8 Claims. (Cl. 180—90)

This invention relates generally to a motor vehicle body construction, and particularly to a unitary instrument panel crash pad and radio speaker grille.

It is customary in motor vehicle body construction to install a radio speaker grille in the instrument panel. Normally, the sheet metal instrument panel is provided with an opening for the insertion of a sheet metal speaker grille. More recently, it has become common practice to provide instrument panels with crash pads thereon to protect the occupants of the vehicle from injury during accidents. Here again, separate sheet metal speaker grilles have been installed in openings in the instrument panel and crash pad to accommodate a radio speaker beneath the panel.

It is an object of the present invention to provide an improved structure in which the speaker grille is formed as a unitary part of the padded instrument panel, to not only provide a simplified and economical construction but to enhance the appearance of the unit. In an embodiment of the invention, a rigid plastic insert is mounted within an enlarged opening formed in the foam padding, and is formed with alternate depressed and raised portions with the depressed portions being apertured to form a grille. A thin covering material of vinyl or other suitable material completely covers the foam padding and the rigid insert, with the covering material following the contour of the insert and being provided with openings therein aligned with openings in the insert. A unitary construction is thus provided which is pleasing in appearance and styling, and which may be completely preassembled as a unit to effect economies in construction.

Other objects and advantages of this invetnion will be made more apparent as this description proceeds, particularly when considered in connection with the accompanying drawings, in which:

Figure 2 is a cross sectional view taken on the line 2—2 of Figure 1;

Figure 3 is a cross sectional view taken on the line 3—3 of Figure 1;

Figure 1:
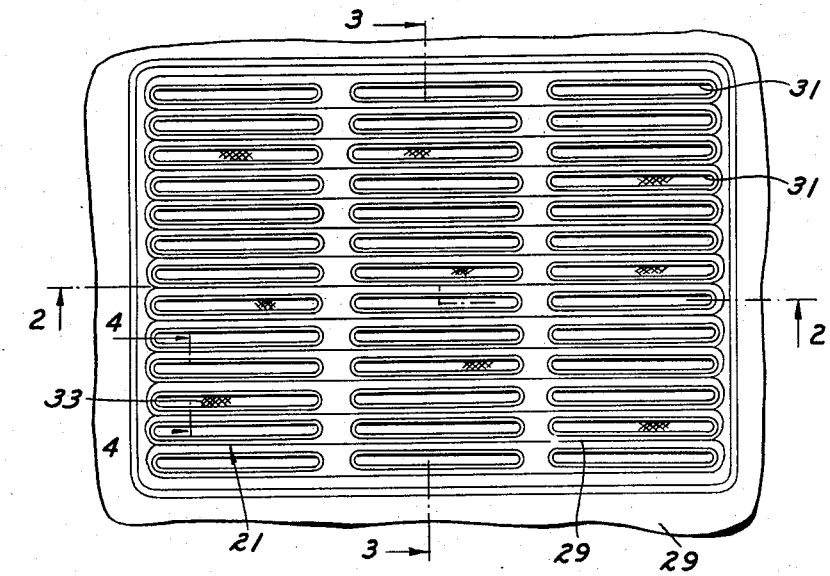
Figure 1 is a plan view of a portion of an instrument panel incorporating the present invention.

Referring now to the drawings, the reference character 11 indicates a sheet metal instrument panel conventionally secured to the vehicle body structure. In the substantially horizontal upper portion of the panel, the latter is formed with a downwardly offset portion 12 having an enlarged rectangularly shaped opening 13 therein.

Seated upon the upper surface of the instrument panel 11 is a relatively thick resilient foam pad 14. As is conventional, the pad 14 varies in thickness, having its greatest thickness adjacent the forward portion 16 of the instrument panel to afford protection to the vehicle occupants during accidents. The foam pad is formed with an enlarged rectangular opening 17 aligned with the opening 13 in the instrument panel 11, and has a downwardly depending flange 18 adjacent the opening 17 which rests upon and is supported by the downwardly offset flange 12 of the instrument panel.

Adjacent the upper surface of the foam pad 14, the latter is formed with a downwardly offset ledge or shoulder 19 extending continuously around the margin of the opening 17. This shoulder supports a rigid insert panel 21 which may be molded of a suitable plastic material.

Figure 4:
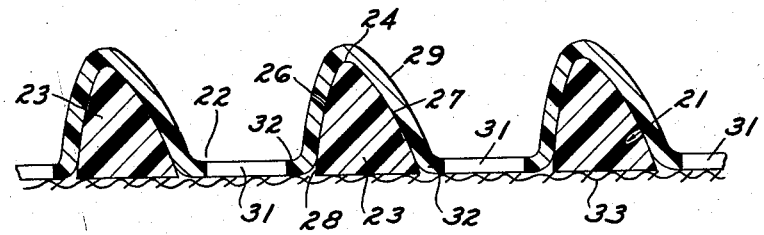
Figure 4 is an enlarged cross sectional view of a portion of Figure 3.

Although the rigid insert panel 21 may take a variety of forms, it is shown herein as being a one piece panel having a plurality of alternate depressed troughs 22 and raised ridges 23 arranged parallel to each other in three separate groups transversely of the instrument panel. As best seen in Figure 4, each ridge 23 is somewhat pear shaped, having a peak 24 and curved downwardly sloping side walls 26 and 27. It will be noted that the peak 24 is offset from the center of the ridge in a direction toward the front of the vehicle so that the side wall 26 is somewhat steeper than the side wall 27. Elongated openings 28 are thus formed in the troughs 22 intermediate the raised ridges 23. It will be noted from Figures 2 and 3 that the bases of the openings 28 are substantially in alignment with the plane of the continuous shoulder 19 formed in the pad 14, and that the peaks 24 of the ridges 23 are substantially in the plane of the upper surface of the pad 14.

The entire instrument panel assembly is covered with a thin covering material 29 which may be of vinyl or other suitable material. The vinyl covering 29 extends over the surface of the resilient foam pad 14, and also over the upper surface of the rigid plastic insert 21, thus forming continuity to the structure and to its appearance. It will be seen from Figure 3 that the vinyl covering 29 conforms to the contour of the ridges 23 of the plastic insert, being adhered thereto by means of a suitable thermosetting resin.

Referring particularly to Figure 4, it will be noted that elongated slots 31 are formed in the vinyl covering 29 in the depressed troughs intermediate the parallel ridges 23. The slots 31 are somewhat narrower than the slots 28 in the plastic insert so as to provide a narrow rolled edge 32 of vinyl material extending completely to the base of the plastic insert panel, and completely concealing the side walls 26 and 27 of each ridge 23 from view when viewed from above the instrument panel.

In one method of construction of the instrument panel assembly described above, the vinyl covering 29 is cemented to the preformed plastic insert panel 21 by means of a thermosetting resin and a vacuum process. The subassembly of the vinyl covering and the plastic insert is then positioned in a suitable mold, and the resilient foam pad 14 is molded in place. The vinyl covering 29 is then punched to form the elongated slots 31, and a cloth backing 33 is cemented to the lower side of the insert panel. Thereafter, the assembled unit is supported upon the sheet metal instrument panel 11 as shown.

It will be apparent that the padded instrument panel thus incorporates, as a unitary part thereof, a speaker grille for a radio speaker mounted beneath the panel.

It will be understood that the invention is not to be limited to the exact construction shown and described, but that various changes and modifications may be made without departing from the spirit and scope of the invention, as defined in the appended claims.

What is claimed is:

1. An instrument panel for a motor vehicle comprising a sheet metal panel having an enlarged opening therein, a resilient pad overlying said sheet metal panel and having an enlarged opening therein in alignment with the opening in said panel, said resilient pad having a depressed ledge at the periphery of the opening therein offset downwardly from the upper surface of said pad, a preformed insert mounted in the opening in said resilient pad and supported upon said depressed ledge, said insert having a plurality of closely spaced openings therein separated from each other by intermediate raised portions, and a thin covering material overlying the upper surface of said resilient pad and said insert and conforming to the contour thereof and adhered thereto, said covering having openings therein in alignment with the openings in said insert to form a grille.

2. The structure defined by claim 1 which is further characterized in that the closely spaced openings in said insert are substantially in the plane of said depressed ledge and the peaks of said intermediate raised portions are substantially in the plane of the upper surface of said resilient pad.

3. The structure defined by claim 1 which is further characterized in that the closely spaced openings in said insert are in the form of parallel elongated slots.

4. In a safety padded instrument panel for a motor vehicle body, a sheet metal panel adapted to be mounted upon said body and having an enlarged opening therein for a radio speaker grille, a relatively thick resilient foam padding supported upon the upper surface of said sheet metal panel to form crash protection for the occupants of the vehicle, said resilient foam padding having an enlarged opening therein aligned with the opening in said sheet metal panel and generally corresponding in shape and size therewith and formed with a shoulder adjacent the periphery of said opening offset downwardly from the upper surface of said padding, a rigid insert mounted in said opening and supported upon said shoulder, said rigid insert having a plurality of alternate raised and depressed portions with openings formed in said depressed portions, and a thin covering material overlying the upper surface of said resilient foam padding and said rigid insert and adhered thereto, said covering conforming closely to the raised and depressed portions of said rigid insert and having openings therein in alignment with the openings in said insert to form a unitary radio speaker grille.

5. The structure defined by claim 4 which is further characterized in that said shoulder extends completely around the periphery of the opening in said resilient foam padding to provide a continuous support for the marginal edge of said rigid insert, the portion of said sheet metal panel adjacent the edge of the opening therein underlying said continuous shoulder to provide rigid backing therefor.

6. The structure defined by claim 4 which is further characterized in that the openings in the depressed portions of said rigid insert are narrow elongated slots arranged parallel to each other.

7. The structure defined by claim 6 which is further characterized in that said raised portions have narrow peaks terminating generally in the plane of the upper surface of said resilient foam padding and wider bases joined to the peaks by sloping sides.

8. The structure defined by claim 4 which is further characterized in that the openings in said thin covering material are smaller than the openings in said rigid insert so that said covering material completely covers the sides of said raised portions to completely conceal the rigid insert from view when viewed from above the instrument panel.

No references cited.